United States Patent Office 2,838,572
Patented June 10, 1958

---

2,838,572

2-(BENZYLOXYMETHYL)-2-METHYL-1-PENTANOL

Raymond H. Rigterink, Midland, Mich., assignor to The Dow Chemical Company, Midland, Mich., a corporation of Delaware No Drawing. Application April 4, 1957
Serial No. 650,552

2 Claims. (Cl. 260—611)

The present invention relates to 2-(benzyloxymethyl)-2-methyl-1-pentanol having the formula

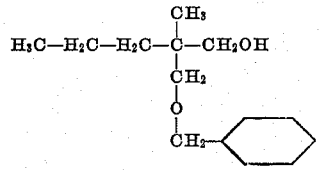

This new compound is a colorless liquid somewhat soluble in many organic solvents and of low solubility in water. The compound is useful as a herbicide and is adapted to be employed in dust and spray compositions for the control of the growth and the killing of weeds and for the sterilization of soil with regard to the growth of plants.

The new compound may be prepared by causing a reaction between 2-methyl-2-propyl-propane-1,3-diol, an alkali metal hydroxide and α-chlorotoluene whereby the hydrogen of one of the primary hydroxyl groups of the diol reactant is replaced by a benzyl group. The reaction may be carried out in the presence of water or an inert organic solvent. Good results are obtained when the reactants are employed in substantially equimolecular proportions. The reaction is somewhat exothermic and takes place readily at the temperature range of from 80° to 140° C. with the production of the desired ether product and sodium chloride of reaction. The temperature may be controlled by regulating the rate of contacting the reactants and by external cooling.

In carrying out the reaction, the α-chlorotoluene may be contacted portionwise with a mixture of the 2-methyl-2-propyl-propane-1,3-diol and the alkali metal hydroxide. In an alternative procedure, the alkali metal hydroxide may be contacted portionwise with a mixture of the α-chlorotoluene and 2-methyl-2-propyl-propane-1,3-diol reactants. In either method of operation, the reactants are mixed together with stirring and at a temperature of from 80° to 140° C. The mixing of the reactants may be carried out in an inert solvent. Following the contacting of the reactants, stirring may be continued and the resulting mixture maintained at a temperature of from 80° to 140° C. for a period of time to assure completion of the reaction. Upon completion of the reaction, the reaction mixture is cooled to room temperature, washed with water and the organic layer fractionally distilled under reduced pressure to separate the desired product as a liquid.

The following operation illustrates the present invention but is not to be construed as limiting.

α-Chlorotoluene (139.3 grams; 1.1 moles) was added portionwise over a period of 15 minutes to a mixture of 132 grams (1.0 mole) of 2-methyl-2-propyl-propane-1,3-diol and 44 grams (1.1 moles) of flake sodium hydroxide. The addition was carried out with stirring and at a temperature of 120° C. Stirring was thereafter continued and the mixture maintained at 120° to 125° C. for two hours to assure completion of the reaction. The reaction mixture was cooled to room temperature and washed twice with water, and the organic layer fractionally distilled under reduced pressure to obtain a 2-(benzyloxymethyl)-2-methyl-1-pentanol product as a water white liquid. The latter boiled at 150°–155° C. at 5 millimeters pressure; and had a refractive index $n/D$ at 25° C. of 1.502, and a specific gravity of 0.987 at 25/20° C.

The compound of the present invention has been tested and found to be effective as a herbicide, i. e., for the killing of weeds. For such use, the product may be dispersed in an inert finely divided solid and employed as a dust. Also, such mixture may be dispersed in water with the aid of a wetting agent, and the resulting aqueous suspension employed as a spray. In other procedures, the product may be employed as a constituent of oil-in-water emulsions, or water dispersions with or without the aid of wetting, dispersing or emulsifying agents. In representative operations, substantially complete controls of the growth of the seeds and emerging seedlings of Japanese millet were obtained with 2-(benzyloxymethyl)-2-methyl-1-pentanol, when the compound was dispersed in soil at a dosage of 50 pounds per acre.

I claim:

1. 2-(benzyloxymethyl)-2-methyl-1-pentanol.

2. A method for the manufacture of 2-(benzyloxymethyl)-2-methyl-1-pentanol which comprises the step of reacting together substantially equimolecular proportions of 2-methyl-2-propylpropane-1,3-diol, α-chlorotoluene and an alkali metal hydroxide and at a temperature of from about 80° C. to about 140° C.

References Cited in the file of this patent

UNITED STATES PATENTS

| | | |
|---|---|---|
| 1,999,315 | Baldwin | Apr. 30, 1935 |
| 2,139,369 | Kyrides | Dec. 6, 1938 |